(12) United States Patent
Lathrop

(10) Patent No.: US 10,525,897 B2
(45) Date of Patent: Jan. 7, 2020

(54) BIKE RACK FOR TRUCK BEDS TRAILERS AND VEHICLES

(71) Applicant: Jeremy Len Lathrop, Meridian, ID (US)

(72) Inventor: Jeremy Len Lathrop, Meridian, ID (US)

(*) Notice: Subject to any disclaimer, the term of this patent is extended or adjusted under 35 U.S.C. 154(b) by 0 days.

(21) Appl. No.: 15/350,015

(22) Filed: Nov. 12, 2016

(65) Prior Publication Data

US 2018/0134228 A1 May 17, 2018

(51) Int. Cl.
*B60R 9/10* (2006.01)
*B62H 3/08* (2006.01)
*B62D 33/02* (2006.01)

(52) U.S. Cl.
CPC ........... *B60R 9/10* (2013.01); *B62D 33/02* (2013.01); *B62H 3/08* (2013.01)

(58) Field of Classification Search
CPC .... B60R 9/10; B62H 3/08; B62H 3/00; B62D 33/02; B60P 3/077; B60P 3/075
USPC ........ 224/405, 403, 924; 211/17, 18, 19, 20, 211/21, 22; 410/3
See application file for complete search history.

(56) References Cited

U.S. PATENT DOCUMENTS

| | | | | |
|---|---|---|---|---|
| 516,571 A * | 3/1894 | Moulton | ......... | B62H 3/04 211/21 |
| 574,629 A * | 1/1897 | Phillips | ......... | B62H 3/12 211/17 |
| 3,366,256 A * | 1/1968 | Meredith | ......... | B60R 9/06 414/462 |
| 4,437,597 A * | 3/1984 | Doyle | ......... | B60R 9/10 211/20 |
| 5,301,817 A * | 4/1994 | Merritt | ......... | A47F 7/04 211/20 |
| 5,692,659 A * | 12/1997 | Reeves | ......... | B60R 9/06 224/504 |
| 5,833,074 A * | 11/1998 | Phillips | ......... | B60R 9/10 211/21 |
| 6,062,396 A * | 5/2000 | Eason | ......... | A47F 7/04 211/20 |
| 6,640,979 B1 * | 11/2003 | Mayfield | ......... | B62H 3/00 211/20 |
| 6,682,292 B2 * | 1/2004 | Estes | ......... | B60D 1/58 280/402 |

(Continued)

FOREIGN PATENT DOCUMENTS

GB 2377682 A * 1/2003 ............... B62H 3/08
GB 2377682 A * 1/2003 ............... B60R 9/00

*Primary Examiner* — Nathan J Newhouse
*Assistant Examiner* — Lester L Vanterpool

(57) ABSTRACT

A bike rack for, but not limited to, truck and vehicle beds using an over center locking mechanism actuated by a lever. The mechanism is combined with a clamping arm that, allows a bike to be secured by a single movement of the lever. The bike is secured without removing the bike's wheels. The same lever when reversed in a single movement, will quickly release the bike to be immediately removed. A slide assembly and tuning knob will allow for adjustment to fit different tire diameters. The bike rack can be attached to a vehicle using a crossbar or other means of attachment. To mount the bike, the bike's wheel is placed into the rack and the clamping arm is lowered against the tire and locked into position by the lever creating a pressure fit.

7 Claims, 8 Drawing Sheets

(56) References Cited

U.S. PATENT DOCUMENTS

| | | | | |
|---|---|---|---|---|
| 7,150,359 | B1* | 12/2006 | Lyons | B62H 3/08 211/20 |
| 7,958,973 | B2* | 6/2011 | Swasand | B60T 3/00 188/32 |
| 8,662,803 | B2* | 3/2014 | Bowman | B60P 3/075 410/9 |
| 9,186,540 | B2* | 11/2015 | Bass | A63B 22/0605 |
| 9,610,993 | B1* | 4/2017 | Ho | B62H 3/08 |
| 9,650,092 | B1* | 5/2017 | Tsai | B62H 3/04 |
| 2006/0108297 | A1* | 5/2006 | Gay | B62H 3/04 211/20 |
| 2006/0237376 | A1* | 10/2006 | Eakin | B60P 3/077 211/20 |
| 2007/0017882 | A1* | 1/2007 | Lewis | B62H 3/08 211/20 |
| 2007/0246496 | A1* | 10/2007 | Reeves | B60P 3/077 224/403 |

* cited by examiner

BIKE RACK FOR TRUCK BEDS TRAILERS AND VEHICLES

FIELD OF INVENTION

The invention is related to bike, scooter and motorcycle carrying rack systems intended for vehicles and vehicle beds, such as, but not limited to trucks and trailers.

BACKGROUND

Bike racks are a well-known means of transporting a bike on a vehicle. A bike rack designed for vehicles is a structure that attaches in many ways but most common are on the top, back, front, or in the bed of vehicles. The bike will then be attached to the rack structure and a bike can be attached and removed as needed. In most cases the bike racks that are available require straps and/or multiple steps to secure a bicycle. The process of mounting a bicycle can be cumbersome and difficult to secure a bike well. In the case of installing in a truck bed there are few solutions available that look aesthetically pleasing combined with a way to attach a bike securely. Further, users have a desire to combine a rack system that will allow the bike to stand upright, avoid removing any wheels, have a simple to use design and be very fast to mount and unmount a bike. An ideal bike rack is one that looks aesthetically pleasing, is quick and simple to install and remove a bike with as few steps as possible while keeping the bike secure and firmly held into place. Bicycles have increased in expense and protecting them during travel is important. If parts from the bike rack attach to or touch the painted surfaces of the bicycle it can damage the paint during travel.

OBJECTIVE AND SUMMARY OF INVENTION

The present invention solves the points mentioned heretofore.

People using trucks and trailers want a simple-to-use bike rack that can hold a bike in the bed of a vehicle securely with a one-step way to mount the bike quickly. The invention provides a solution for this.

The term "bike" shall refer to road bike, mountain bike, bmx bike, dirt bike, street bike and the like.

The invention is mainly created for bicycles but is not limited to bicycles and may be used to carry many types of 2 wheeled vehicles such as a bike, motorbike or scooter. A person can insert a bike into the invention and easily hand turn a lever to clamp it down, nothing further is required to firmly secure the bike into the rack. The present invention requires as little time and effort as possible to mount and dismount a bike and one is able to execute either process in about 1 second. The efficiency of the mounting process is due to the over center lock and lever combined with a clamping arm. The bike is installed with its wheels attached so no modification to the bike is required. Only the bike wheel is touched by the invention eliminating possible contact with painted surfaces that can be damaged. The design aesthetics of the invention are such that it adds elegance to the vehicle it is attached to. Mounting a bike without removal of its wheels is highly desirable. The invention is a bike rack that has an appealing aesthetic which is important to the user. People are looking for a rack that will add a unique and appealing look to their vehicle while having a simple and secure mounting function.

DETAILED DESCRIPTION OF THE INVENTION

Figure 1:
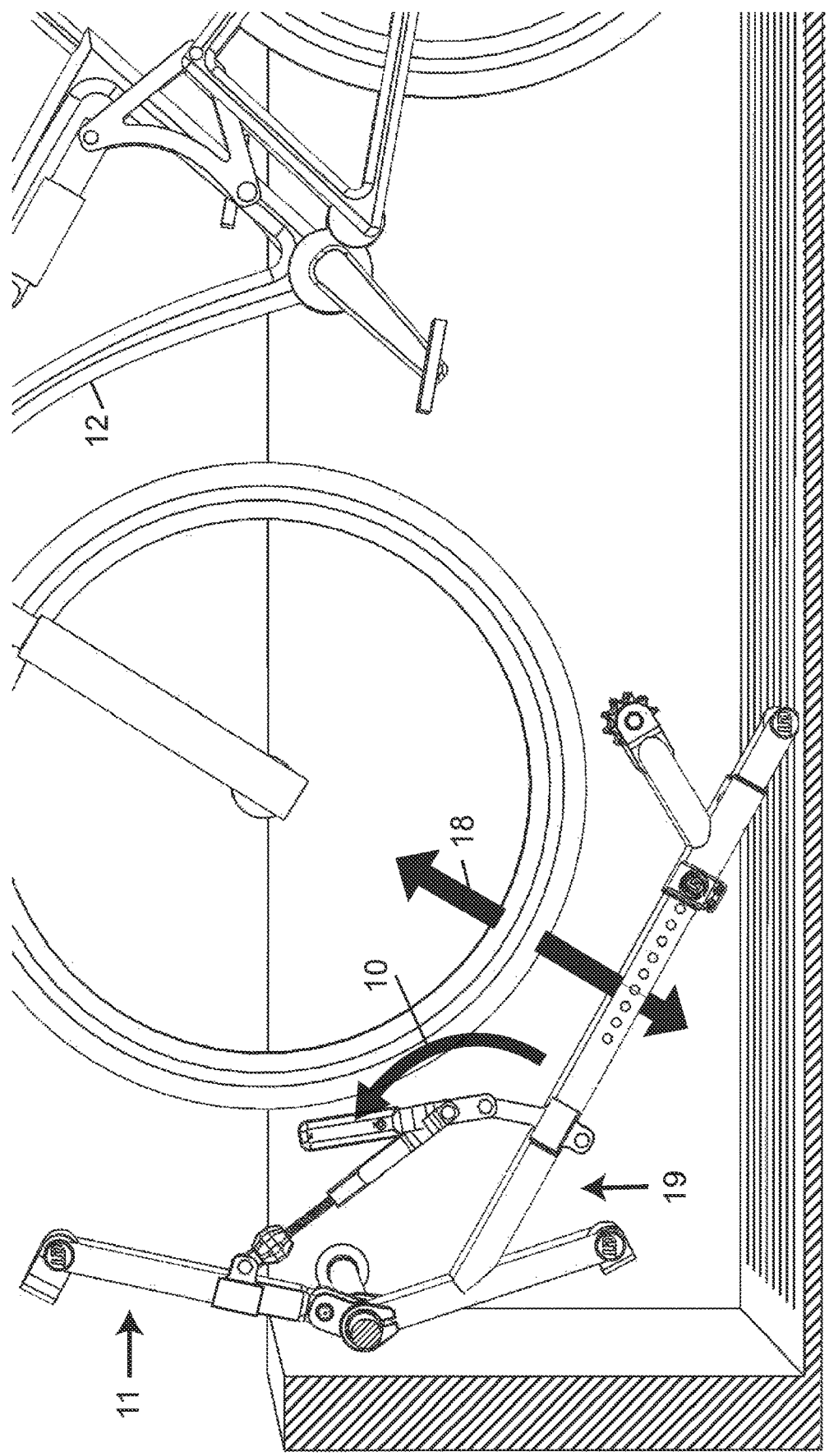
FIG. 1, Is a side view of a bike rack assembly according to the invention in a vehicle bed illustrating movement of a bike placed into or being removed from the bike rack assembly while the clamping arm is raised.
Figure 2:
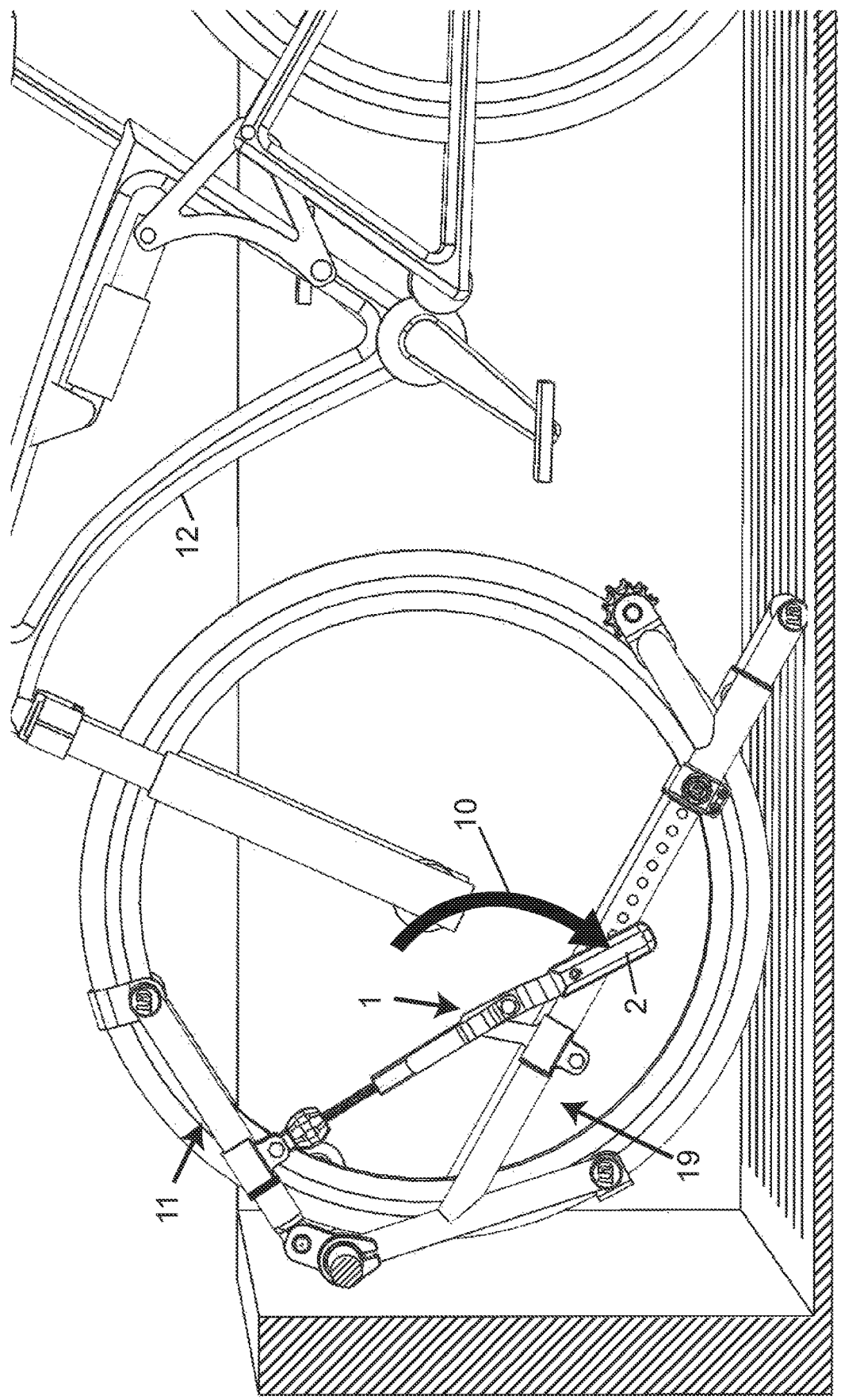
FIG. 2, Is a side view of the bike rack assembly according to the invention in a vehicle bed showing a bike installed with the clamping arm lowered.
Figure 3:
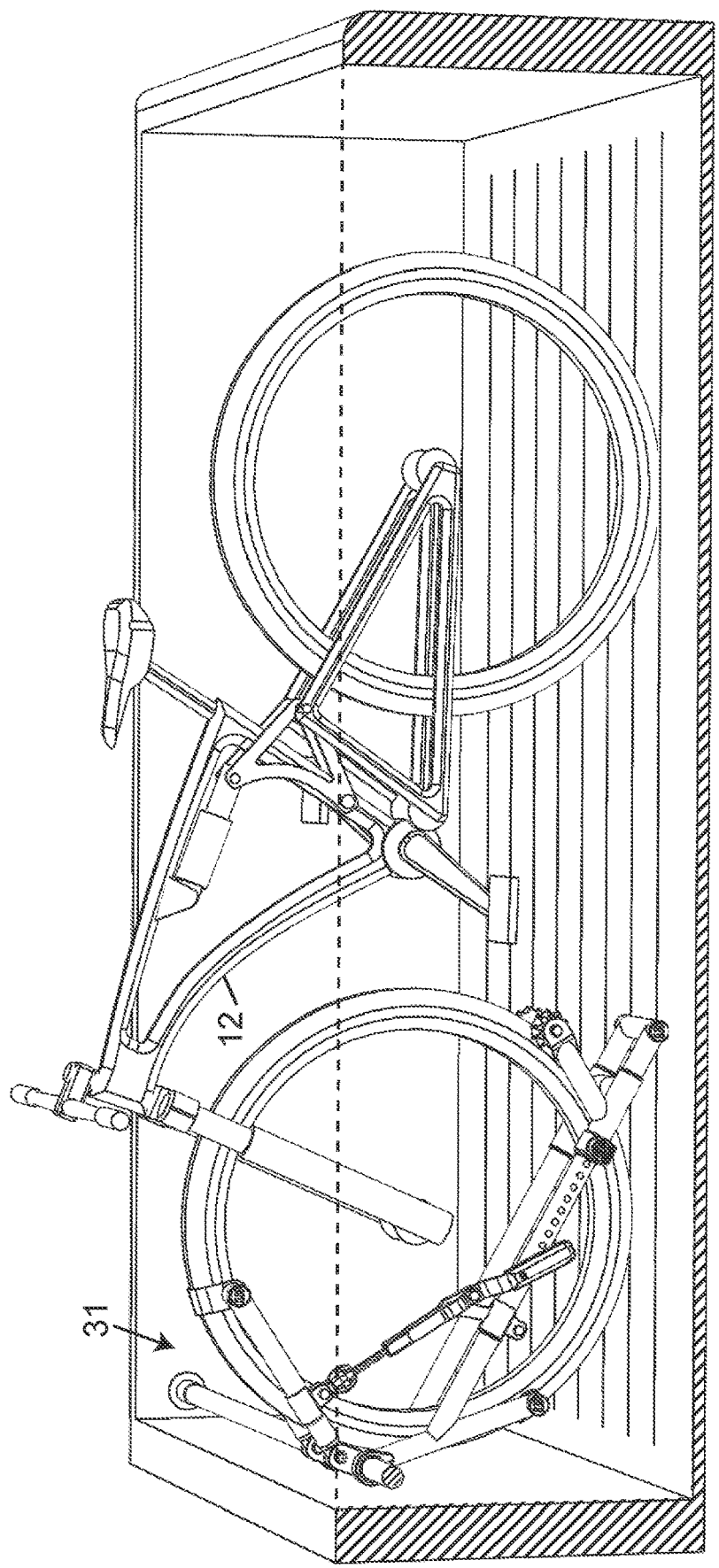
FIG. 3, Is an elevated side view of the bike rack assembly according to the invention installed in a vehicle bed with a bike installed into the bike rack assembly.
Figure 4:
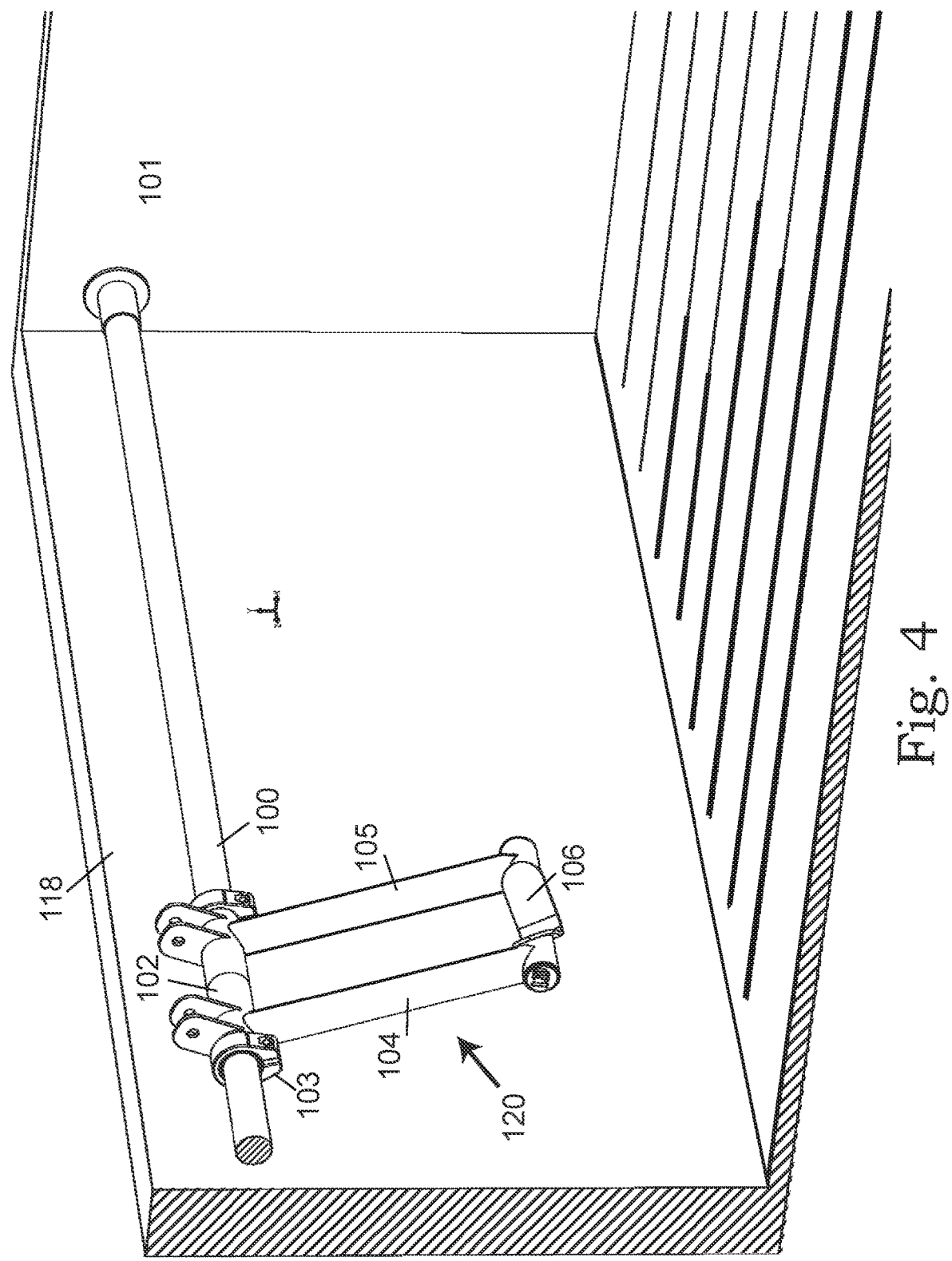
FIG. 4, Is a perspective partial view of the bike rack assembly illustrating the rack head and bed rail portion of the bike rack assembly.
Figure 5:
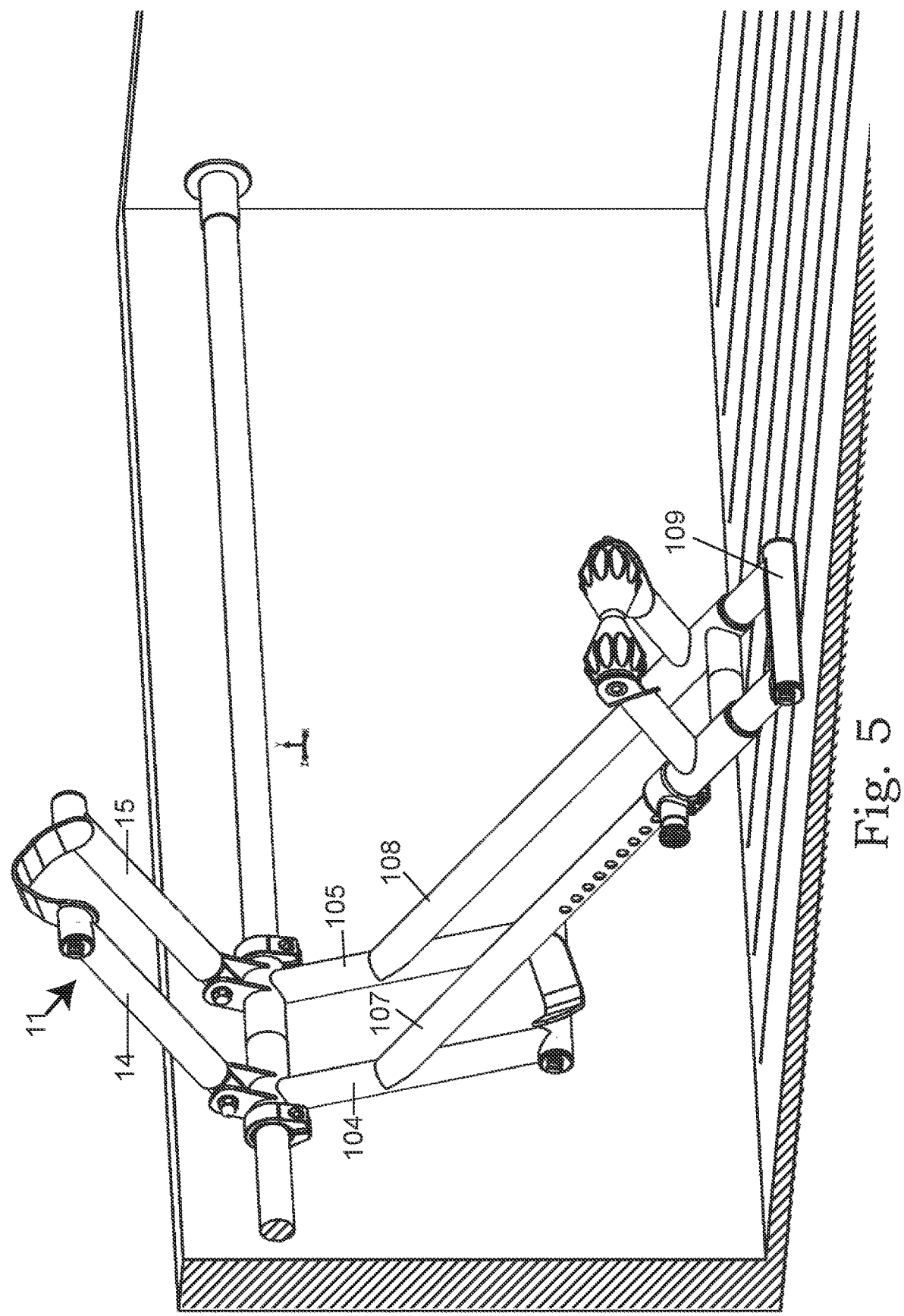
FIG. 5, Is a perspective view of the bike rack assembly minus the over center locking mechanism.
Figure 6:
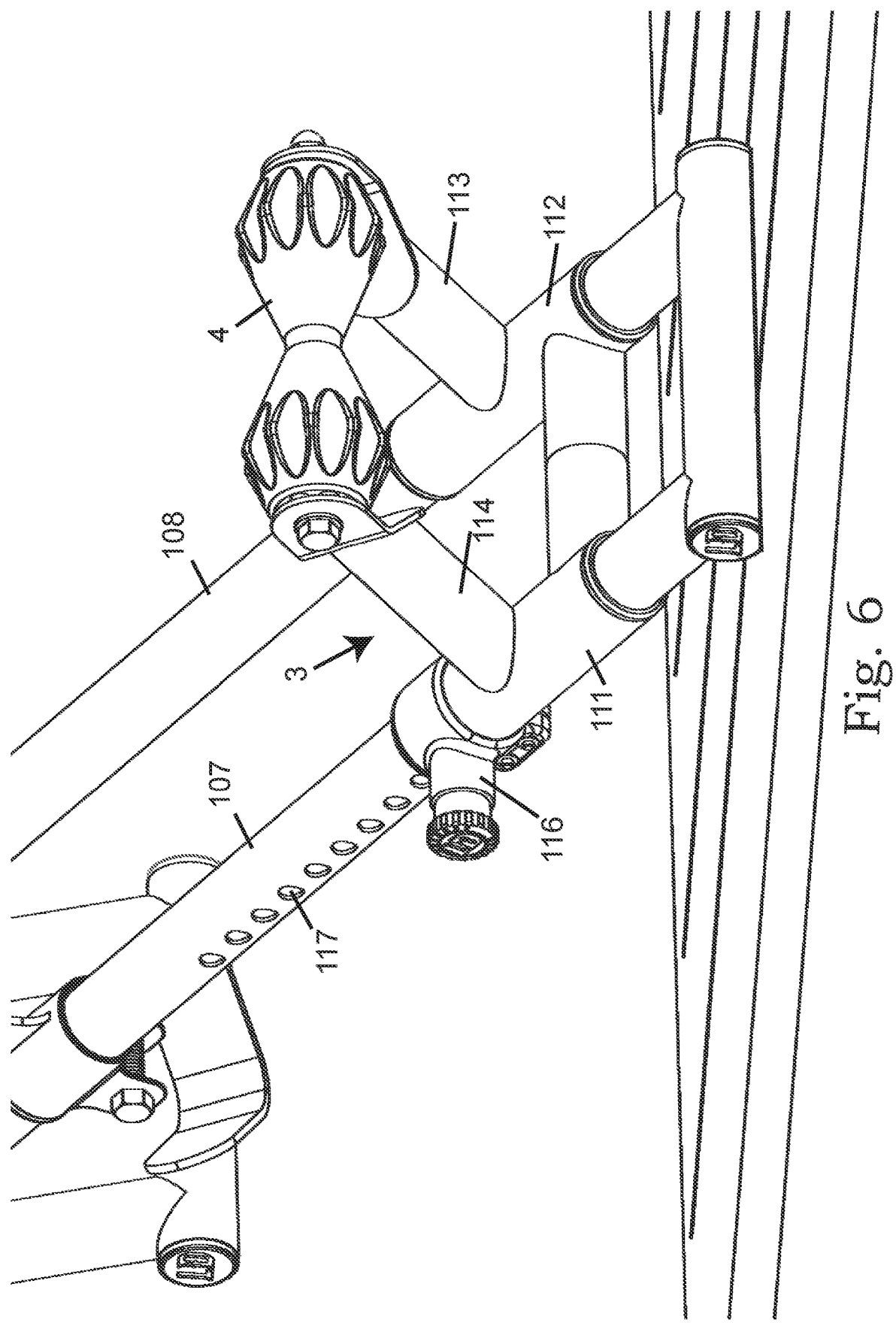
FIG. 6, Is a perspective close up view of the slide assembly.
Figure 7:
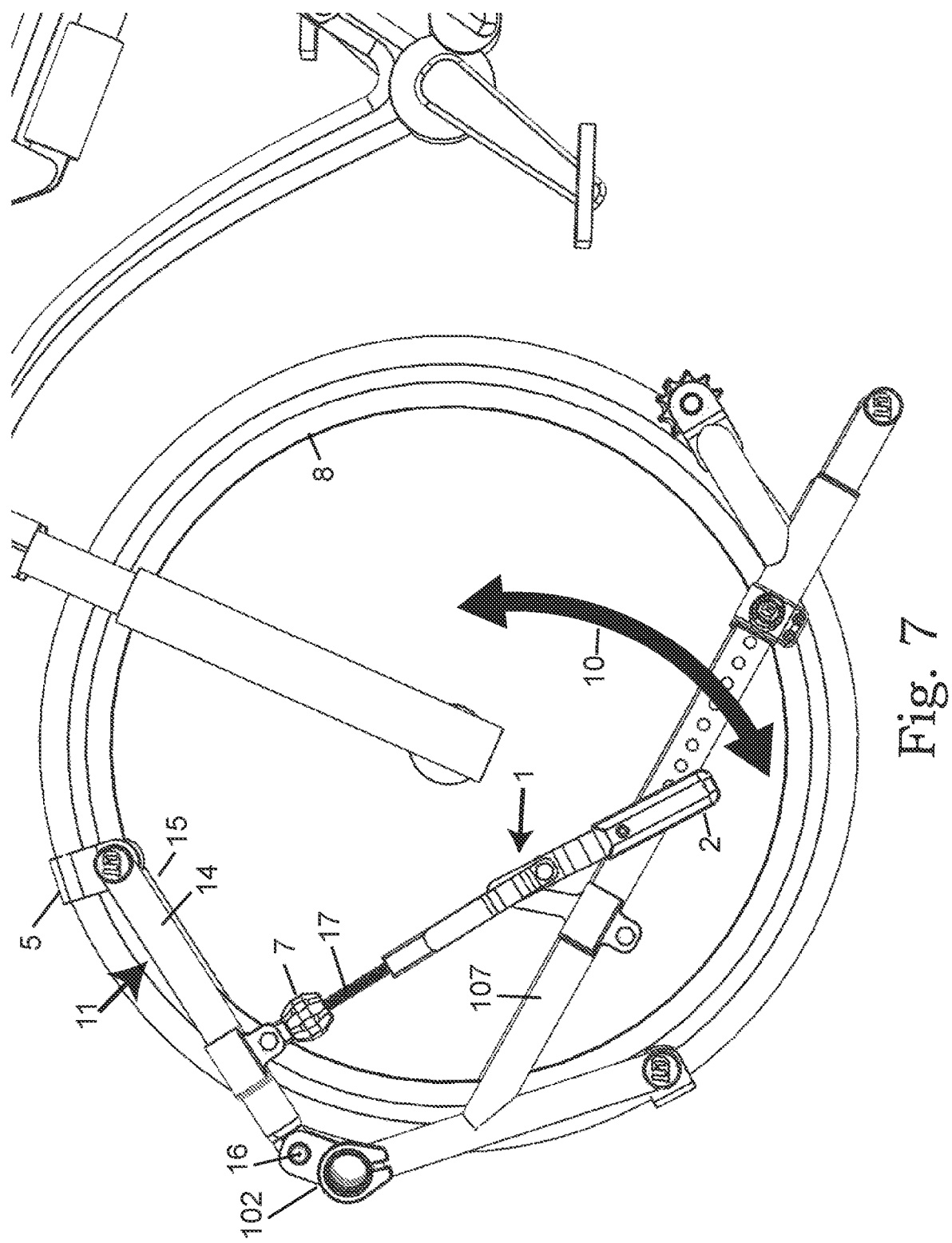
FIG. 7, Is a side view of the bike rack assembly.
Figure 8:
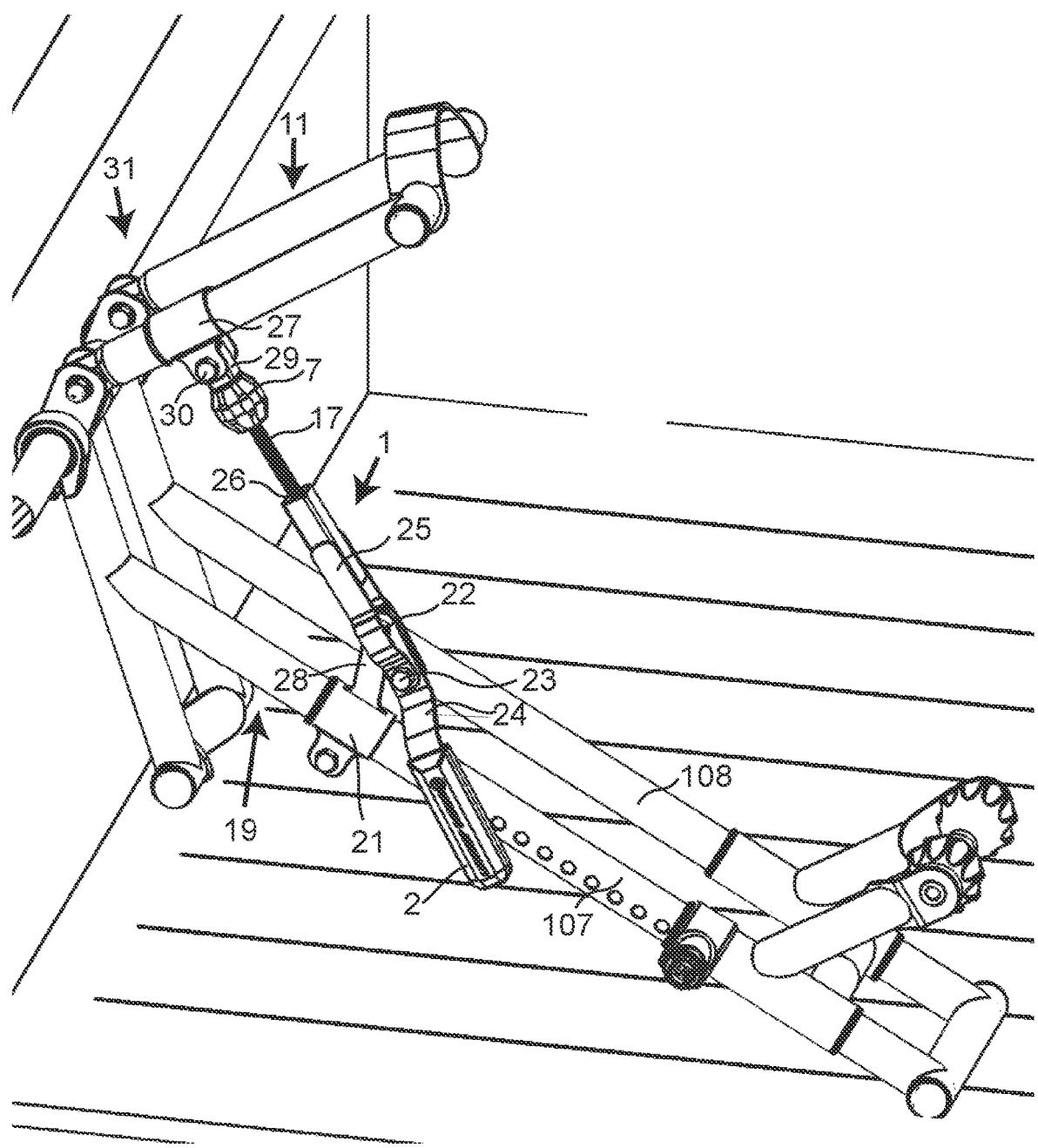
FIG. 8, Is a perspective view of the bike rack assembly.

1. The invention will now be described in detail with reference to drawings FIG. 1-8. Referring now to FIG. 1, a bike 12 placed into or being removed 18 from the rack 19 while the clamping arm 11 is raised 10. Now referring to FIG. 2, a bike 12 installed into the rack 19 while the clamping arm 11 is secured with the over center locking mechanism 1 by fully lowering 10 the lever 2. Referring now to FIG. 3, the bike rack assembly 31 installed in a vehicle bed with a bike 12 mounted into the bike rack assembly. Referring now to FIG. 4, the bed rail 100 which spans across a vehicle bed 118 and anchored to the vehicle bed walls 101. The mounting cross member 102 is attached to the bed rail 100 and fixed into position with clamps 103. The bed rail 100 may be omitted and the mounting cross member 102 can be attached directly to the vehicle bed 118 by means of clamping or bolting or other means of attachment. The rack head 120 comprising a mounting cross member 102 at the upper end rigidly attached perpendicular to two rails 104, 105, at the opposite lower end between the rails a wheel chock 106 is rigidly attached creating a rectangular structure. Now referring to FIG. 5, two parallel guide rails 107, 108 are rigidly attached at an obtuse angle to the mid portion of rails 104, 105. A cross member 109 is attached to the opposite end of the guide rails 107, 108 in a perpendicular orientation by bolts or other removable fastening method. Referring now to FIG. 6, the slide assembly 3 comprising two parallel rails 111, 112 telescopically mounted on the guide rails 107, 108 where each telescopic rail has a rigidly attached arm 113, 114 to support the alignment roller 4. Said alignment roller is mounted to the attachment arms 113, 114 using a bolt and bushing which allows the alignment roller 4 to spin freely. A modular pop pin mechanism 116 is fixed to one of the telescopic rails of the slide assembly 3 and can be moved and re-mounted to either telescopic rail 111 or 112 for access on the left or right side of the bike rack. The slide assembly 3 is able to freely slide along the guide rails 107, 108 which have a plurality of holes 117 that align with the pop pin 116. When adjusting the slide assembly 3 the pop pin 116 will be hand operated to fix the slide assembly to one of the holes 117 thereby making the slide assembly hand adjustable to fit most known bike wheel sizes. Now referring to FIG. 7, the clamping arm 11 is hinge attached to the mounting cross member 102. Said clamping arm comprising two parallel rails 14, 15 (Also shown in FIG. 5) with a wheel chock 5 rigidly attached between them at the rail ends opposite the hinge attachment 16. The clamping arm 11 is additionally attached to the guide rail 107 by an over center lock 1 which is actuated by a lever 2 allowing a bike to be firmly secured in a single movement of the lever 2 where by hand operation is required to rotate the lever 2 downward 10 and the hinge attached clamping arm 11 is thereby driven downward and the clamping arm wheel chock 5 is pressed firmly against the bike tire 8 creating sufficient pressure to secure the bike. Likewise removing a bicycle requires hand operation of the lever 2 in an upward motion 10 to completely raise the clamping arm 11 for removal of the bicycle. A threaded bolt 17 has a knob 7 fixed to its shaft that allows for hand rotation of the bolt 17 which is implemented in-line with the over center locking mechanism 1 creating means to hand shorten and lengthen the distance between the over center lock 1 and the clamping arm 11. Now referring to FIG. 8, the over center locking mechanism 1 comprising the following: A clamp 21 remove-ably mounted to the left or right guide rail 107, 108, said clamp with a rigidly mounted arm 28 attached to the handle arm 24 so that the two are hinged 22. The lever arm 24 is additionally attached to the middle arm 25 creating a second hinge 23. A threaded insert 26 is rigidly mounted to the middle arm 25 at the end opposite the hinge 23. A threaded bolt 17 is threaded into the threaded insert 26 attaching the middle arm 25 to the upper arm 29. Upper arm 29 is fixed to the head of the threaded bolt 17 in such a way that the threaded bolt 17 can rotate. The tuning knob 7 is securely attached to the threaded bolt 17 allowing for hand rotation of the threaded bolt 17. The upper arm 29 is hinge 30 connected to the upper clamp 27. The upper clamp 27 is removable and can be attached the opposite side of the clamping arm 11. The over center locking mechanism 1 is able to mount on the left or right side of the rack 19 and clamping arm 11. The combination of 2, 7, 17, 21, 22, 23, 24, 25, 26, 27, 28, 29, 30 are described as the over center locking mechanism 1. Hinge 22 and 23 are arranged in such a way that when the lever 2 is fully lowered the hinges pass their center points enough to create a locking pressure when clamping a bike tire into the bike rack assembly 31.

What is claimed is:

1. A bike rack for truck and vehicle beds, said rack comprising; a vehicle bed rail, a rack structure, a slide assembly telescopically attached to the rack structure, said slide assembly structurally supporting a free spinning alignment roller, a clamping arm that is hinge attached to the rack structure, a tuning knob detachably mounted to the said clamping arm by a clamp hinge unit in such a way that a threaded adjustment bolt can rotate, in addition the threaded bolt can spin in the direction of its threads and is thereby threaded into an over center locking mechanism which has an integrated lever for operation, said over center locking mechanism is detachably mounted to the rack structure.

2. The bike rack for truck and vehicle beds of claim 1, where the said over center lock is actuated by the lever allowing a bike to be firmly secured in a single movement of the lever where by hand operation is required to rotate the lever downward and a hinge attached clamping arm and wheel chock is thereby driven downward and is pressed firmly against the tire creating pressure and securely locking the bike into the rack structure and likewise removing the bike requires hand operation of the lever in an upward motion to completely raise the clamping arm for removal of the bike.

3. The bike rack for truck and vehicle beds of claim 1, where the over center locking mechanism can be mounted on either the left or right side of the bike rack so the lever can conveniently face outward on either side of the truck or vehicle bed depending on which side of the vehicle the rack is mounted.

4. The bike rack for truck and vehicle beds of claim 1, where the said threaded adjustment bolt has a knob fixed to its shaft that allows for hand rotation of the bolt which is implemented in-line with the over center locking mechanism creating means to hand shorten and lengthen the distance between the over center lock and the clamping arm whereby small incremental adjustments can be made to create the suitable pressure of the clamping arm against a bike tire.

5. The bike rack for truck and vehicle beds of claim 1, where a telescopically attached slide assembly locks into multiple positions along the rack structure using a pop pin which can engage into a series of holes in the guide rails and allows for the bike rack to adjust to various wheel diameters.

6. The bike rack for truck and vehicle beds of claim 1, where an alignment roller is mounted perpendicular to the slide assembly and said alignment roller has an hour glass shape which allows a bike wheel to settle into the center of the alignment roller, further the alignment roller will slightly rotate against the bike wheel as pressure is applied by said clamping arm of claim 1 which drives the bike wheel firmly into the rack structure.

7. The bike rack for truck and vehicle beds of claim 1, whereby the rack attaches to a bed rail in parallel alignment and can slide along the bed rail to be fixed in various positions, the said rail is adjustably attached to the vehicle bed and spans from one side of the bed to the other; the combination of the bed rail and the rack creates the means by which the bike rack structure is mounted to a vehicle bed and allows for multiple bike racks to be mounted to the same rail, however the bed rail may be omitted and the rack can be fixed to vehicle beds in other ways including but not limited to directly mounting with clamps or bolts.

\* \* \* \* \*